United States Patent [19]

Russell

[11] Patent Number: 5,287,886

[45] Date of Patent: Feb. 22, 1994

[54] GAS LINE OVERRIDE VALVE

[76] Inventor: Jim L. Russell, 5018 S. Irvington Ave., Tulsa, Okla. 74135

[21] Appl. No.: 62,111

[22] Filed: May 14, 1993

[51] Int. Cl.⁵ ............................................. F16K 17/12
[52] U.S. Cl. .................................. 137/606; 137/519.5
[58] Field of Search ............... 137/599.1, 606, 533.11, 137/519.5; 251/152; 73/201

[56] References Cited

U.S. PATENT DOCUMENTS

| 1,609,359 | 12/1926 | Humphrey | 137/519.5 X |
| 3,756,349 | 9/1973 | Kluh | 137/519.5 X |
| 3,861,415 | 1/1975 | Larsen | 137/519.5 X |
| 5,178,188 | 1/1993 | Russell | 137/606 |

Primary Examiner—John C. Fox
Attorney, Agent, or Firm—Catalano, Zingerman & McKay

[57] ABSTRACT

A gas line override valve for connecting an external gas source to an operational gas line includes a sleeve having an inlet end and an outlet end adapted for series connection of the sleeve in the operational gas line, a hole through a wall of the sleeve and a coupling secured in the hole having a passage in pneumatic communication between a first port in the coupling external of the sleeve and a second port in the coupling internal of the sleeve, the second port having an annular seat along a perimeter thereof. A cage extending from the second port into the sleeve loosely contains a ball of diameter greater than the diameter of the annular seat. The cage has openings therethrough for continuous pneumatic communication between the inlet and outlet ends of the sleeve. The ball is free to move into and out of abutting interface with the seat to close the second port when the pressure in the sleeve exceeds the pressure in the coupling passage and to open the second port when the pressure in the coupling passage exceeds the pressure in the sleeve.

8 Claims, 2 Drawing Sheets

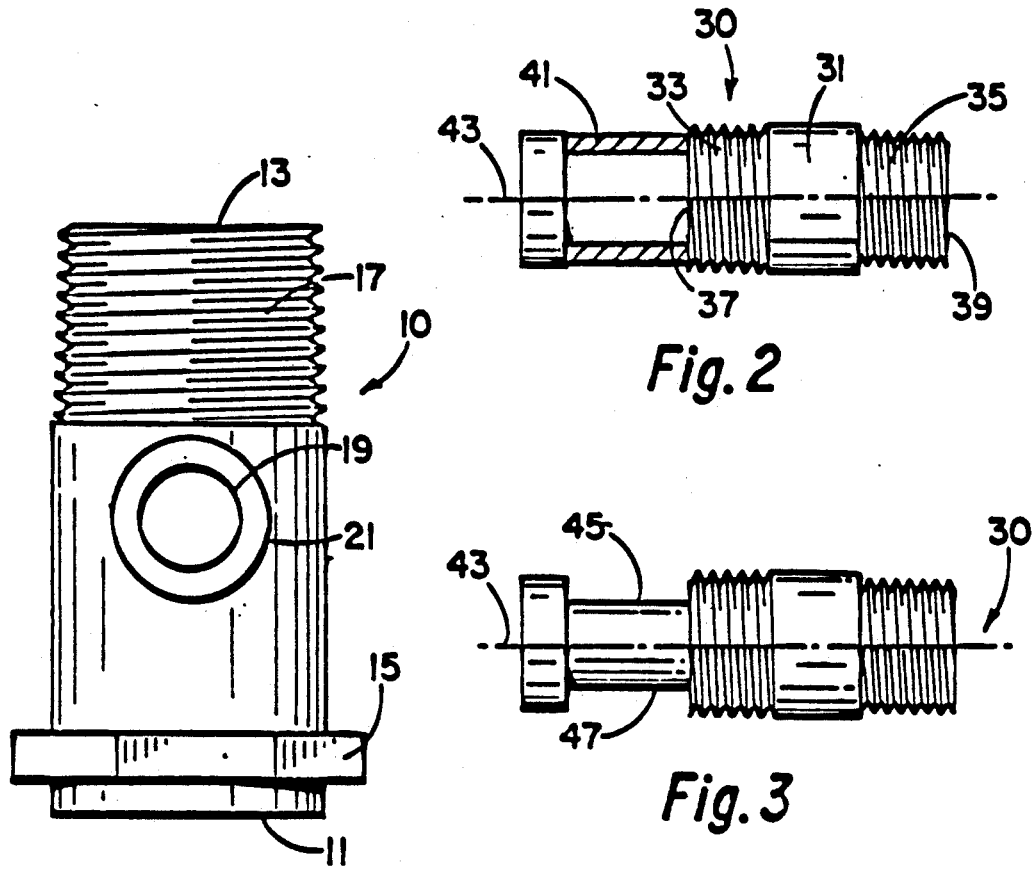
Fig. 1
Fig. 2
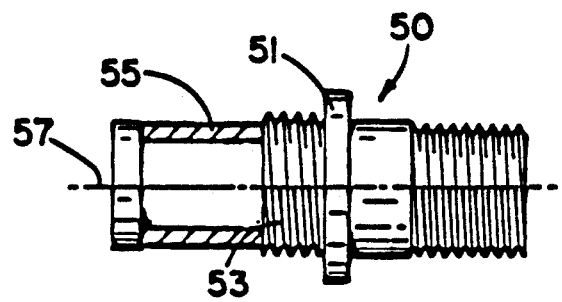
Fig. 3
Fig. 4
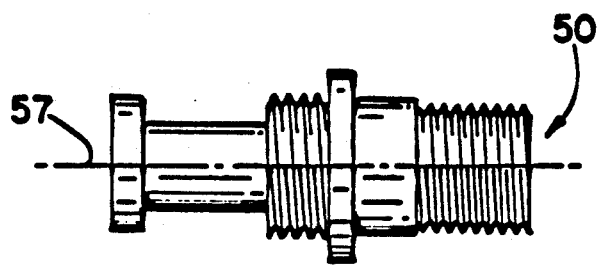
Fig. 5

GAS LINE OVERRIDE VALVE

BACKGROUND OF THE INVENTION

This invention relates generally to gas distribution systems and more particularly concerns valves used to temporarily connect external gas sources to operational customer gas lines.

The basic concept of a gas line override valve is explained in my U.S. Pat. No. 5,178,188 which teaches the use of a meter bypass swivel connector in the replacement of natural gas meters. In that application, a quick disconnect coupler 91 is snugly attached in a hole provided in a sleeve in the operational gas line. The coupler has a bias mechanism which prevents flow of gas through the coupler under normal conditions. Pressure from an external source on the biasing means opens the coupler to permit flow of gas from the external source into the sleeve. While this arrangement works effectively, the gas flow rate from the external source into the gas lines is limited by the biased coupler.

In another application of override valves, gas companies generally insert a regulator in the aboveground gas company line connecting the gas meter to the underground gas company feeder system. The pressure in the gas company's line is generally 50 to 60 psi and the regulator reduces the pressure on the customer side of the regulator to 9.2 inches of water column up to 2 pound systems. It is now becoming common practice for a gas company to insert a pressure excess flow valve with a manual reset in the underground line. This valve will close to cut off the underground line flow and protect the 9.2 inch water column side of the system if an increase in pressure exceeds the capacity of the 9.2 inch water column. However, once the underground excess flow valve has been operated, accessing the buried manual reset is a very expensive problem.

It is, therefore, an object of this invention to provide a gas line override valve having a quick disconnect coupler which maximizes input gas flow through the coupler into the operational gas lines. Another object of this invention is to provide a gas line override valve connectable above ground between the operational gas line regulator and the underground feeder to the system. It is also an object of this invention to provide a gas line override valve connectable in the high pressure side of an operational gas line capable of feeding gas at pressures sufficient to overcome the input pressures to the excess flow valve and thus reset the manual reset of the excess flow valve. A further object of this invention is to provide a gas line override valve which facilitates resetting of the excess flow valve without damage to the low pressure portion of an operational gas line. Still another object of this invention is to provide a gas line override valve which facilitates resetting of the excess flow valve without direct access to the flow valve.

SUMMARY OF THE INVENTION

In accordance with the invention, a gas line override valve for connecting an external gas source to an operational gas line is provided. The valve body consists of a sleeve having an inlet end and an outlet end, each adapted for series connection of the sleeve in the operational gas line. A hole through a wall of the sleeve threadedly receives a coupling having a passage in pneumatic communication between first and second ports external and internal of the sleeve, respectively. The second port has an annular seat along its perimeter. A cage extending from the second port into the sleeve loosely contains a ball of diameter greater than the diameter of the annular seat. The cage has openings permitting continuous pneumatic communication between the inlet and outlet ends of the sleeve. The ball is free to move into and out of abutting interface with the seat to close the second port when the pressure in the sleeve exceeds the pressure in the coupling passage and to open the second port when the pressure in the coupling passage exceeds the pressure in the sleeve.

Preferably, the cage is cylindrical and the openings are diametrically opposed slots of length greater than the ball diameter and of width less than the ball diameter. Also, preferably, the cylindrical cage extends into the sleeve to a point closer to the sleeve wall than the length of the ball diameter so as to prevent the ball from slipping out of the end of the sleeve. The coupling and the cage are preferably aligned transversely or diametrically in relation to the sleeve with the coupling being threadedly engaged in the hole and the first port being adapted for connection to the external gas source. A removable cap blocks pneumatic flow through the first port when the external gas source is disconnected from the coupling.

BRIEF DESCRIPTION OF THE DRAWINGS

Other objects and advantages of the invention will become apparent upon reading the following detailed description and upon reference to the drawings in which:

FIG. 1 is a front elevation view of a sleeve adapted for series connection in an operational gas line;

FIG. 2 is a top plan view of one preferred embodiment of a coupling for use with the sleeve of FIG. 1;

FIG. 3 is a side elevation view of the coupling of FIG. 2;

FIG. 4 is a top plan view of another preferred embodiment of a coupling for use with the sleeve of FIG. 1;

FIG. 5 is a side elevation view of the coupling of FIG. 4;

Figure 7:
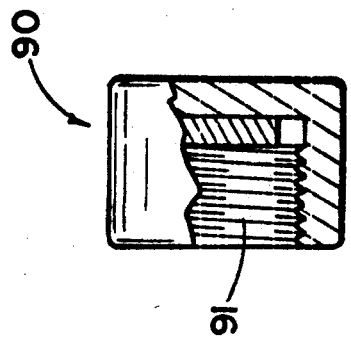
FIG. 7 is a front elevation view with parts broken away of a cap for the coupling of FIG. 6.

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION OF THE INVENTION

Turning first to FIG. 1, a cylindrical sleeve 10 has an inlet end 11 and an outlet end 13. The inlet end is provided with an annular flange 15 for use in connecting the sleeve 10 to the gas line by use of a swivel nut (not shown) which may be slipped over the sleeve 10 and threaded onto the end of the gas line. The outlet end 13 may be provided with threads 17 for connection in the gas pipe line. The sleeve is provided with a hole 19 extending through a wall thereof, preferably internally threaded and on an axis diametrically extending through the sleeve 10. A circular relief 21 concentric with the hole 19 may be provided in the exterior surface of the sleeve 10.

Turning now to FIGS. 2 and 3, one embodiment of the connector for use with the sleeve illustrated in FIG. 1 is shown. The coupling 30 is preferably a tubular cylinder 31 having one end 33 threaded for connection into the threaded hole 19 in the sleeve 10. The other end 35 is also threaded for connection to an external gas source or cap. The open end 37 of the coupling 30 provides a first port which is in pneumatic communication through the tubular coupling 30 to a second port defined by the other open end 39 of the coupling 30. A cylindrical cage 41 extends from the second port 37 along a common longitudinal axis 43 through the coupling 30. The cage 41 is provided with top 45 and bottom 47 slots diametrically opposed therethrough.

Turning briefly to FIGS. 4 and 5, another embodiment of a coupling 50 for use with the sleeve 10 is illustrated which is in all respects similar in configuration to the coupling 30 except that it is provided with an annular ring 51 at the base of the threaded end 53 to which the cage 55 is connected aligned on the longitudinal axis 57 of the coupling 50.

Figure 6:
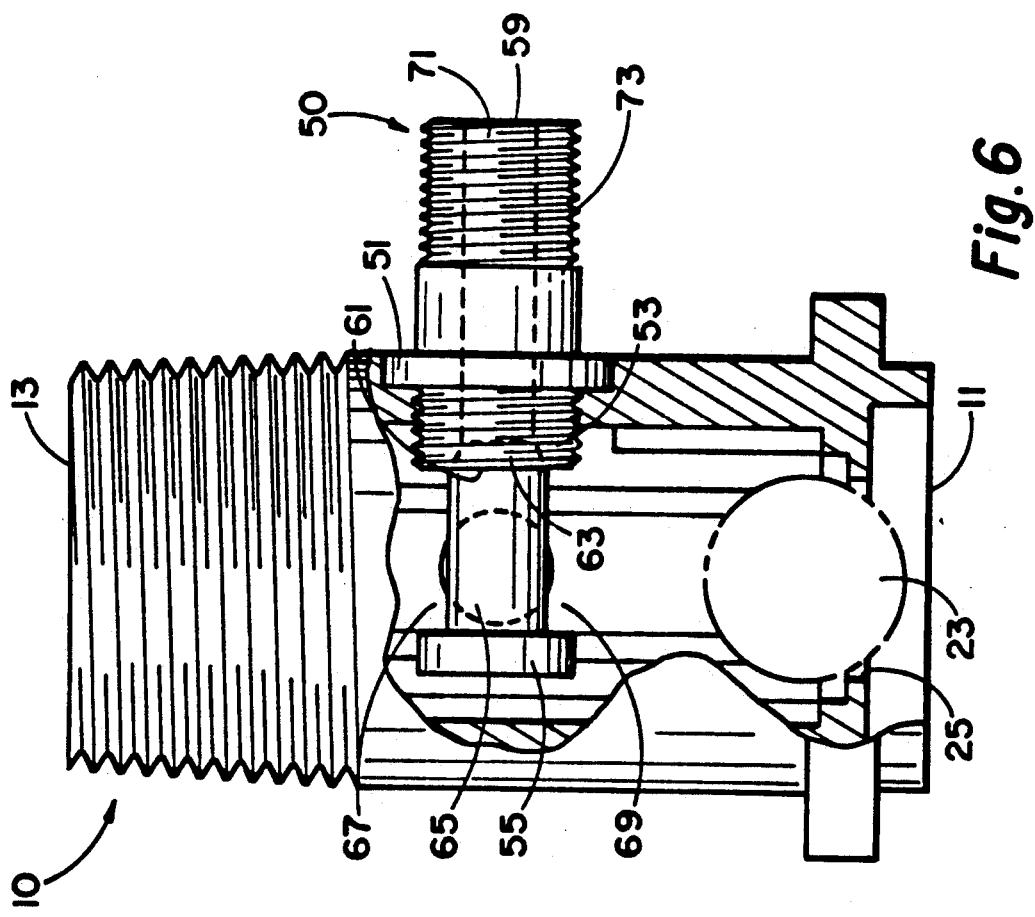
FIG. 6 is a side elevation view with parts broken away of the sleeve of FIGURE with the coupling of FIG. 4 mounted thereon.

Turning now to FIG. 6, the combination of the coupling 50 with the sleeve 10 is illustrated. As shown, the cage 55 is inserted through the hole 19 in the sleeve 10 and the threaded end 53 is screwed into the threads of the hole 19 in the sleeve 10 until the annular ring 51 is fully seated in the relief 21 on the sleeve 10. In this arrangement, the first port 59 of the coupling 50 is external to the sleeve 10 and the second port 61 is internal to the sleeve 10. As shown, the second port 61 is provided with an annular seat 63 along its interior perimeter. The end of the cage 55 inserted into the sleeve 10 preferably extends to a point closer to the wall of the sleeve 10 than the length of the diameter of the ball 65 so that the ball 65 is unable to escape through the insert end of the cage 55. The cage 55 contains a ball 65 having a diameter greater than the diameter of the annular seat 61 and the openings 67 and 69 in cage 55 are longer and narrower than the diameter of the ball 65 so that the ball 65 can neither escape the cage 55 nor block the pneumatic communication between the openings 67 and 69 in the cage 50. The ball 65 is free to move within the cage 55 into and out of abutting interface with the annular seat 63. As shown, the sleeve 10 includes a ball 23 of diameter greater than a passage 25 at the inlet end 11 of the sleeve 10.

In operation, when the sleeve 10 is connected in series in operational gas line (not shown), as gas under pressure enters the sleeve 10 through the inlet end 11, the sleeve ball 23 rises toward the outlet end 13. Gas will therefore continuously flow from the inlet end 11 of the sleeve 10 to the outlet end 13 of the sleeve 10 through the openings 67 and 69 in the cage 55 as well as around the cage 55. The ball 65 is free to move into and out of abutting interface with the annular seat 63 so as to close the second port 61 when the pressure in the sleeve 10 exceeds the pressure in the passage 71 in the coupling 50 and to open the second port 61 when the pressure in the coupling passage 71 exceeds the pressure in the sleeve 10.

A cap 90 having internal threads 91 can be screwed onto the threaded first port end 73 to block pneumatic flow through the first port 59.

Thus, with the sleeve 10 in place in an operational gas line and the cap 90 closing the first port 59 of the coupling 50, flow will be continuous from the inlet end 11 to the outlet end 13 of the sleeve 10. If an external gas source is to be connected to the sleeve 10 through the coupling 50, the cap 90 is removed. When the cap is removed, the pressure in the coupling passage 71 drops below the pressure in the sleeve 10 so that the ball 65 is sucked into snug abutting interface with the annular seat 61, blocking pneumatic communication from the second port 61 to the first port 59 of the coupling 50. Once the external gas source (not shown) is connected to the first port 59 of the coupling 50, if the pressure of the source exceeds the pressure in the sleeve 10, the ball 65 will be forced out of abutment with the annular seat 61 so that pneumatic communication will extend from the first port 59 of the coupling 50 through the passage 71 and the second port 61 of the coupling 50 into the sleeve 10. In the particular embodiment illustrated, if the pressure of the gas source is greater than the pressure in the sleeve 10, the sleeve ball 23 will seal the passage 25 to the inlet end 11 of the sleeve to prohibit flow in a direction from the outlet end 13 to the inlet end 11 of the sleeve 10.

The embodiments of the device illustrated in FIGS. 2 and 3 is preferred if the coupling 30 is made of brass or steel, while the embodiment illustrated in FIGS. 4 and 5 is preferred if the coupling is made of plastic such as Isoplast ® by Dow Chemical Company. Other materials could also be employed. The ball 65 is preferably made of polyethylene. Typically, the sleeve 10 has a malleable iron body with a steel seat beneath a polyethylene ball 23.

Thus, it is apparent that there has been provided, in accordance with the invention, gas line override valve that fully satisfies the objects, aims and advantages set forth above. While the invention has been described in conjunction with specific embodiments thereof, it is evident that many alternatives, modifications and variations will be apparent to those skilled in the art and in light of the foregoing description. Accordingly, it is intended to embrace all such alternatives, modifications and variations as fall within the spirit of the appended claims.

What is claimed is:

1. A gas line override valve for connecting an external gas source to an operational gas line comprising:
   a sleeve having an inlet end and an outlet end adapted for series connection of said sleeve in the operational gas line;
   a hole through a wall of said sleeve;
   a coupling secured in said hole having a passage in pneumatic communication between a first port in said coupling external of said sleeve and a second port in said coupling internal of said sleeve, said second port having an annular seat along a perimeter thereof; and
   a cage extending from said second port into said sleeve and loosely containing a ball of diameter greater than said annular seat therein, said cage having openings therethrough for continuous pneumatic communication between said inlet and said outlet ends of said sleeve, said ball being free to move into and out of abutting interface with said seat to close said second port when pressure in said sleeve exceeds pressure in said coupling passage and to open said second port when pressure in said coupling passage exceeds pressure in said sleeve, respectively.

2. A valve according to claim 1, said cage being cylindrical and said openings being diametrically opposed slots of length greater than said ball diameter and of width less than said ball diameter.

3. A valve according to claim 2, said cylindrical cage extending into said sleeve to a point closer to a wall of said sleeve than the length of said ball diameter.

4. A valve according to claim 2, said coupling and said cage being aligned transversely in relation to said sleeve.

5. A valve according to claim 4, said coupling and said sleeve being aligned diametrically in relation to said sleeve.

6. A valve according to claim 1, said coupling being threadedly engaged in said hole.

7. A valve according to claim 1, said first port being adapted for connection to the external gas source.

8. A valve according to claim further comprising a removable cap for blocking pneumatic flow through said first port.

* * * * *